June 5, 1945. W. H. JOYCE, JR 2,377,631
METHOD AND APPARATUS FOR MANUFACTURING ARTICLES FROM PREFORMED PARTS
Filed May 24, 1941 4 Sheets-Sheet 1

Inventor
WILLIAM H. JOYCE, JR.,
By Herbert A. Huebner
Attorney

June 5, 1945. W. H. JOYCE, JR 2,377,631
METHOD AND APPARATUS FOR MANUFACTURING ARTICLES FROM PREFORMED PARTS
Filed May 24, 1941 4 Sheets-Sheet 2

Inventor
WILLIAM H. JOYCE, JR.,
By
Attorney

June 5, 1945. W. H. JOYCE, JR 2,377,631
METHOD AND APPARATUS FOR MANUFACTURING ARTICLES FROM PREFORMED PARTS
Filed May 24, 1941 4 Sheets-Sheet 3
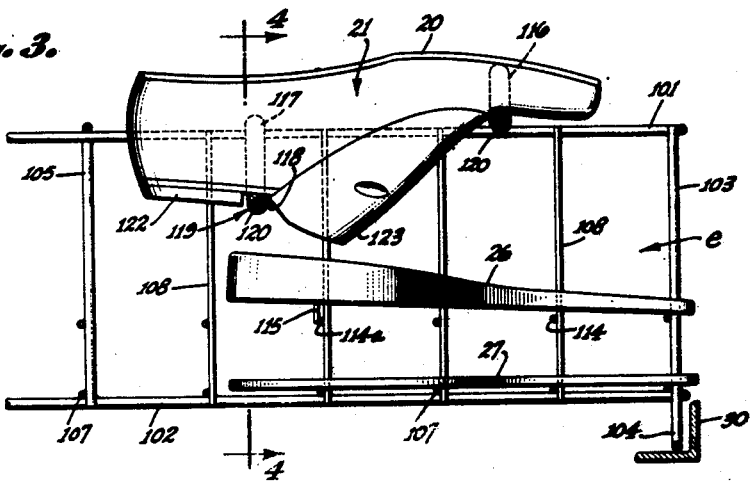
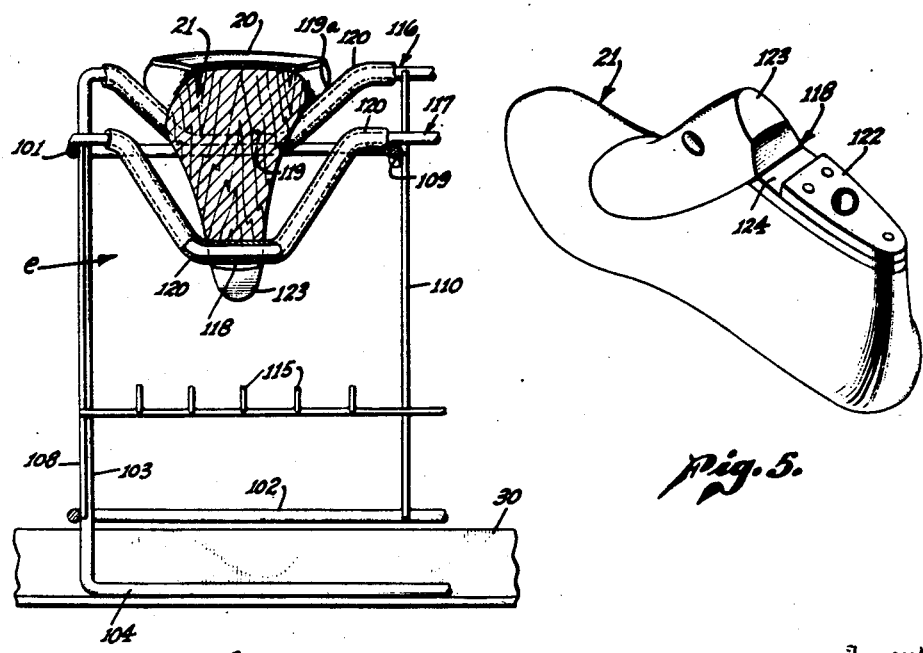
Inventor
WILLIAM H. JOYCE, JR.,

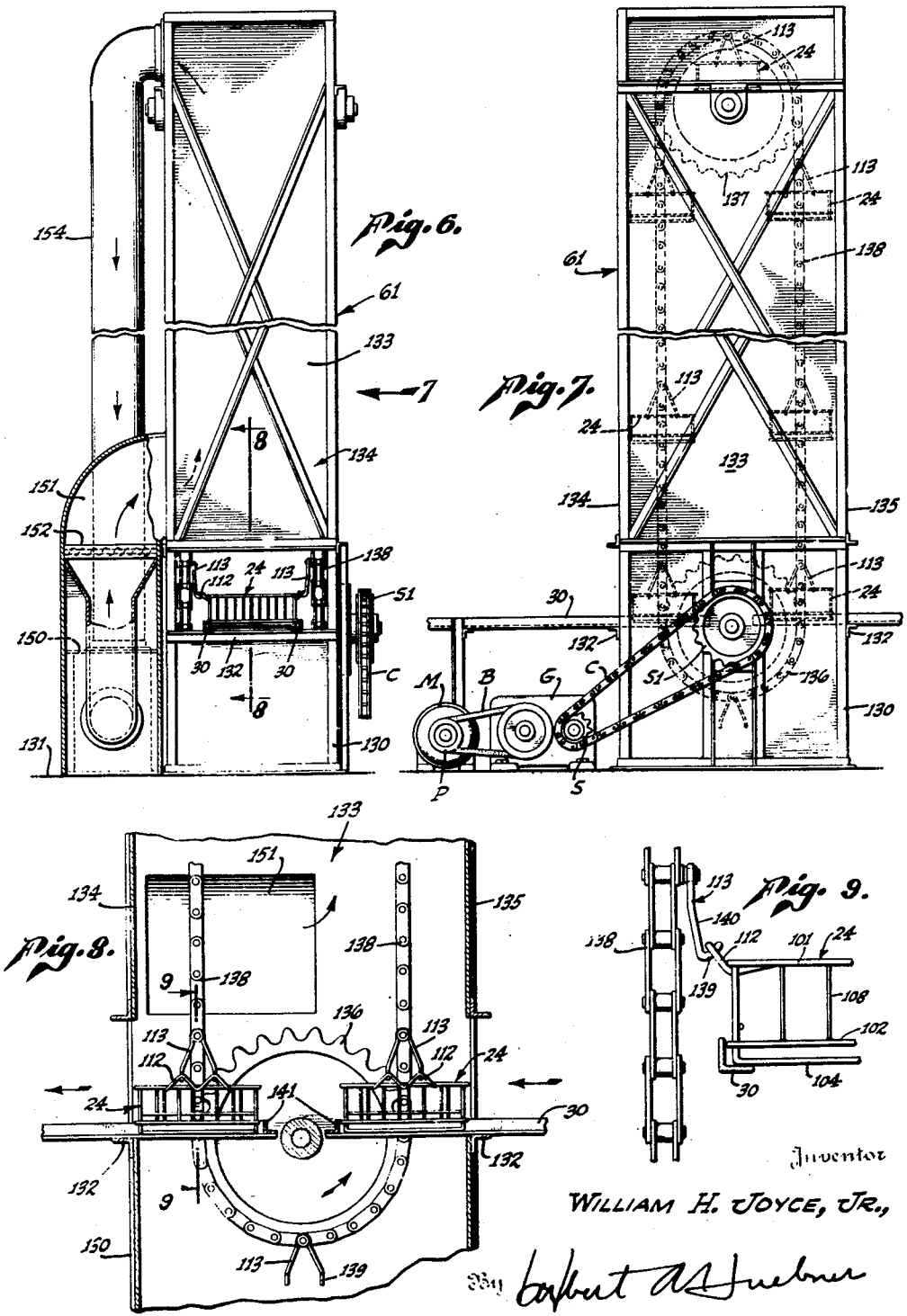

Patented June 5, 1945

UNITED STATES PATENT OFFICE 2,377,631

2,377,631
METHOD AND APPARATUS FOR MANUFACTURING ARTICLES FROM PREFORMED PARTS

William H. Joyce, Jr., Pasadena, Calif., assignor to Joyce, Inc., Pasadena, Calif., a corporation of California Application May 24, 1941, Serial No. 395,050

2 Claims. (Cl. 12—142)

This invention relates generally to the manufacturing of articles from preformed parts, and comprises a new method and apparatus adaptable for the production of numerous articles and devices.

Regarding, for purposes of distinction, some prior conventional manufacturing methods: In assembling automobiles, for example, it is common to employ an assembly line where parts are delivered separately to work stations, and these parts are added to each automobile structure as it is moved along by power. This method has utility where the parts and the finished article are so standardized as to be interchangeable, requiring no discretionary selection, fitting, or extra attention. Such a method allows for no variables in design, pattern, materials or labor. Moreover, it can be used to best advantage only on relatively large articles where sufficient room is naturally necessitated and provided for a sufficient number of workmen at any given point to collectively perform difficult operations equal in time consumption to that required at other stations for fewer workmen to perform simple operations. Such provision is a corollary to the automatic movement of the articles along the assembly line. When such a system is used for assembling smaller articles, assuming they are absolutely standardized, it is ordinarily necessary for grouped workmen performing any given time consuming operation to work on alternate or selected articles at any one station, to compensate in consumed time for more simple and rapidly performed operations.

From another viewpoint, there is a problem in efficiently dealing in fractions of people. There are numerous steps in some manufacturing systems which alone are not enough to keep one man busy, assuming a flow of work synchronized with the slowest operation along the line. That means that, with a fixed time interval for the work to travel a certain distance, some workmen are employed below their capacity.

Another method, found widely used for example in the shoe industry, is to assemble relatively large quantities of parts in portable carriers, or racks, and roll them over the floor from one location to another, allowing the racks to stand with the parts of substantial quantities of shoes therein while work is performed.

Thus, it has been conventional practice to manufacture shoes in thirty-six pair lots, involving large accumulations of partly finished shoes standing in racks while an operator finished an operation on the thirty-six pairs before passing the rack on to the next operator. Unless all thirty-six pairs are of the same pattern, material, color and size, the operator has to sort over and select the matching parts, and even when he does not have to do that the process is wasteful.

Under that process, it is necessary to let the shoes "cure" for two or three days before pulling the lasts. Such a system requires an excessive quantity of lasts and inventory of shoes in process, inconvenient and costly time delay, and large floor space for storage in transit. Moreover, the long exposure often results in the shoes becoming soiled.

It is an object of my invention to provide a method and apparatus for manufacturing articles from preformed parts in multiples of small lots, moving the parts and partly finished articles along a fixed path from one operator or group of operators to the next in rapid, efficient succession amounting in net result to a continuous process.

A further object is to provide a method of manufacturing articles from preformed parts comprising the steps of assembling the preformed parts for an article in a carrier unit adapted to hold the parts for a relatively small number of articles, performing successive assembly operations with and on said parts, manually moving each container along a fixed path as each work operation on the parts therein contained is completed, and thus gradually unloading the container of parts as said work progresses, so that when the work is completed the assembled articles originating from parts in the container may be removed, and the empty container be returned to the point of assembly.

Another object of the invention is to provide a form of apparatus suitable for carrying out the described method. This apparatus will vary according to the nature of the articles to be manufactured, but the minimum essential elements are (1) a track, preferably all on one level, along which are arranged work stations and machines needed for the successive operations; and (2) individual containers designed to slide along the track and constructed to hold the primary parts for a relatively small number of articles, preferably in separate compartments.

As an example of one application of my invention I will describe it in connection with the manufacture of shoes, and particularly a method and apparatus for manufacturing what is generally known as cement process shoes. For an example of shoe in that classification I will refer to shoes having the general characteristics disclosed in my U. S. Patent No. 2,067,963. This shoe, commercially known under the trademark "Cool-Ees," comprises an upper having its lower edges turned under an insole, a cushioning midsole, and an outsole, these three major elements being united in their correct relationship by cement, such as latex.

With reference to the particular embodiment of my invention herein described, it is a further and more specific object of my invention to provide a method and apparatus for the manufacture of shoes in multiples of small lots, moving the parts and the partly finished shoes from one operator or group of operators to the next in rapid, efficient succession amounting, in effect, to a continuous process, thus speeding up production, and producing shoes of improved quality and appearance.

A still further object of my invention is to provide one or more drying periods for controlled curing of the partly finished or finished shoes, by which the least delay in the line consistent with good curing is assured. I preferably include two or more drying or curing operations, one immediately succeeding the application of cement to the upper, midsole and outsole, and the second just before the lasts are pulled. By dividing the drying into two or more periods, there is less congestion at any single point in the line, and I achieve the advantage of intermediate cool off periods, as well as being able to dry at one temperature before assembly of the major elements, and at an increased temperature after these parts have been assembled and pressed.

Further specific objects of my invention are to provide novel apparatus in the form of work baskets, lasts, dryers and the like for practicing the method described as one example of my invention.

Other objects and advantages will become apparent from the description and drawings.

In the drawings:

Figure 3 is a section taken on the line 3—3 of Figure 2, but with the upper omitted to more clearly show the relationship of last and basket.

Figure 4 is a section taken on the line 4—4 of Figure 3.

Figure 5 is a perspective view of a novel form of last employed.

Figure 6 is a vertical end view of one of the dryers.

Figure 7 is a side elevation of the dryer taken in the direction of the arrow 7 in Figure 6.

Figure 8 is a fragmentary cross section taken on the line 8—8 of Figure 6.

Figure 9 is a fragmentary section taken on the line 9—9 of Figure 8.

Figures 1, 10:
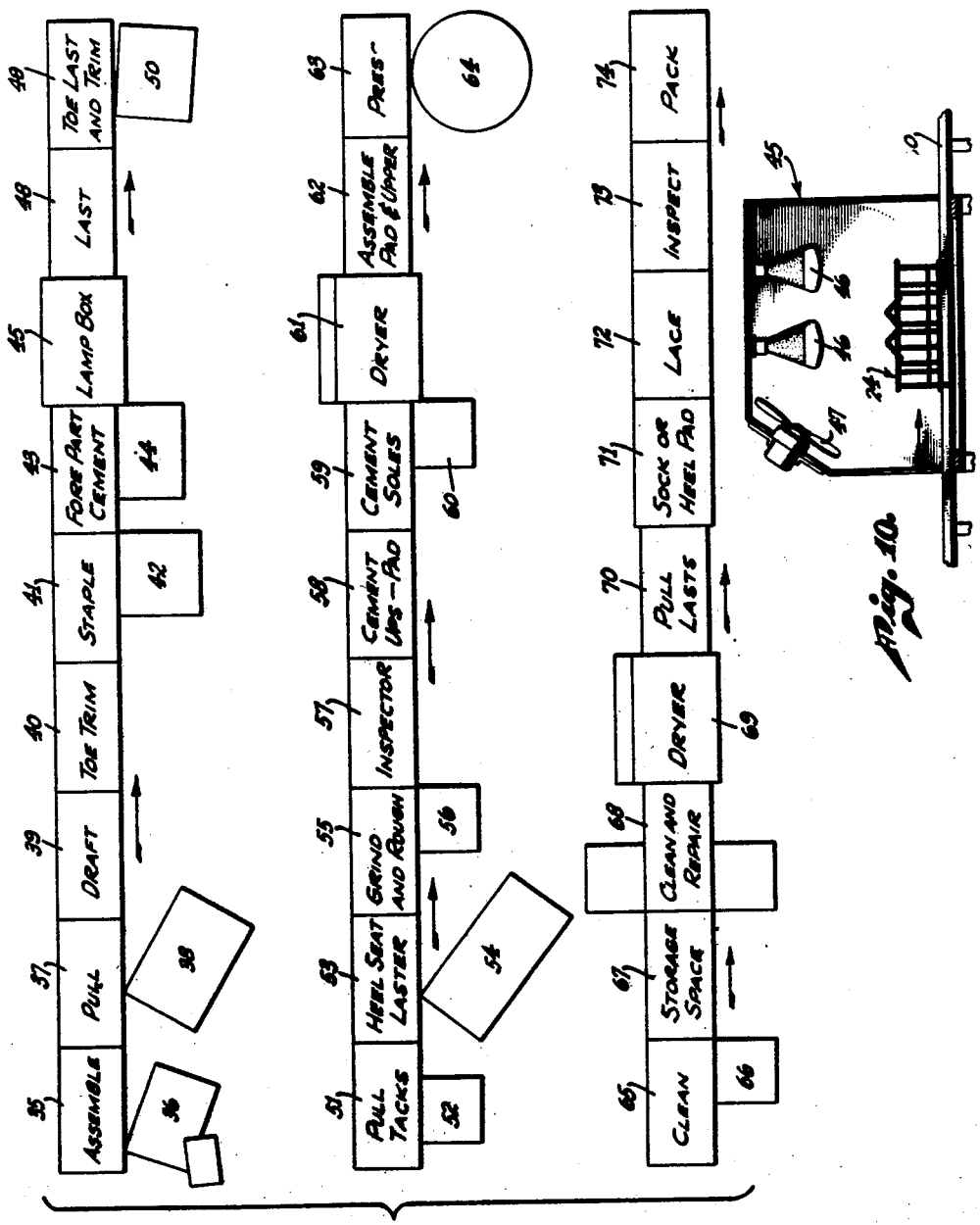
Figure 1 is a diagrammatic layout of a line according to my invention illustrating the flow of work in a shoe manufacturing process.
Figure 10 is a vertical longitudinal section of the lamp box shown in Figure 1.

The work for the line illustrated in Figure 1 originates in other departments such as the cutting, fitting, insole, midsole or pad, and outsole, all culminating in an assembly department. Such parts are brought together in the assembly department, preferably in three pair lots. My method and apparatus contemplates the handling of more or less than three pairs in a lot, but from experience I have selected this unit as most efficient for handling, and the work baskets illustrated are so designed.

In the assembly department the insoles 20 are tacked to the lasts 21, and the uppers 22 are lasted, with their lower edges 23 turned under the insoles. (As inverted, the edges of the uppers appear to lie over the insoles.) The lasted uppers of a pair of shoes are placed in the basket 24 in positions 25 and 25a. Midsoles or pads 26 which have been routed to the assembly station are placed in another compartment of the basket below the lasted uppers, and outsoles 27 are placed in the lowest compartment or shelf. The lasted uppers, midsoles, and outsoles have been made according to a schedule or system and so identified that these major elements of each pair of shoes are brought together in one compartment of the basket.

The work baskets and lasts are of novel construction, the details of which will be subsequently described.

Assuming that each work basket has been filled in the assembly department with the parts for three pairs of shoes, these baskets are started one at a time along the line illustrated in Figure 1.

A track 30 is provided for the baskets to slide in, the track being sufficient if comprising oppositely disposed angle irons mounted on suitable table-high supports (not illustrated) so that the baskets may be slid along by the operators as their respective work is performed. By the phrase "table-high" I mean at such height from the floor as to correspond to the approximate level of ordinary work tables and benches, so that the baskets are within easy and convenient reach of the operators. While the method may be practiced by using a mechanically operated conveyor for the baskets, I have found it satisfactory, and in many respects superior, to have the baskets advanced by hand. Figure 1 shows the line in three sections for clarity of illustration, but the line should be continuous and preferably on the same level.

I provide along the track a series of operator stations as designated in the drawings. These may be varied, of course, to suit requirements. I prefer to use portable machines, wherever possible, in order to give flexibility to the method. Thus, if the run going through requires additional operations a machine may be rolled in. If fewer, a machine may be taken away and used in another line, instead of remaining idle.

At the assembly station 35, the operator removes the last and upper from the basket and tacks the upper onto the last, by use of a machine 36. He returns the upper and last to its place in the basket, and when this operation is completed on all of the shoes in the basket, slides it along the track toward the next station 37, designated pull. Here the forepart is lasted (being temporarily tacked) by means of a machine 38. At station 39, known as draft, the ball and counter are set by tacks. At the toe trim station 40, lining is trimmed out of open toe shoes, otherwise the station may be passed. At station 41, the upper is side lasted and permanently stapled by a machine 42. The work progresses to station 43, were an operator applies cement under the edges of the upper and the lining if there is one, preferably by a cement spraying machine 44.

The baskets containing the shoe parts are moved into a lamp box 45 and there subjected to a brief treatment under infrared lamps 46 and a fan 47. The heat and circulating air cures the cement (preferably latex) in preparation for the next operation.

At station 48, designated last, temporary tacks holding the edges of the upper are pulled, and the edges pounded down to complete the cementing of the forepart of the upper to the insole. At the toe last and trim station 49, a machine 50 is utilized to last in around the toe, spray with cement, push in and heat dry. The next operator, at station 51, and by means of a machine 52, pulls the tacks out of the insole and back seam. At the heel seat laster 53, the operator uses a machine 54 to wipe in the heel seat and permanently tack it all the way around. The next operation, performed at station 55, with an abrasive wheel or wire brush device 56, roughens the edges of the upper for cementing.

The shoe as it now appears is next inspected at station 57, and if found satisfactory, is passed on.

At station 58, cement (preferably latex) is applied to the upper, and both sides of the midsole or pad. The midsole or pad is replaced in its own compartment in the work basket.

At station 59 a machine is employed to apply cement to the outsole, which is replaced in its own compartment in the basket. The operator then pushes the basket into the vertical dryer 61.

For the sake of continuity, a detailed description of the dryer will be reserved until later. It is sufficient to say at this point that the baskets are picked up automatically and carried on a round trip through a vertical chamber through which heated air is circulated. In practice, it has been found that a temperature of about 90° to 100° F. is satisfactory and the cycle may be timed for about one hour, this range being found adequate, and the speed within these limits usually being controlled to synchronize with the average flow of work. All the major components of the shoes are thus subjected to a common curing, which dries the cement in preparation for pressing, and removes some of the moisture from the parts of the shoe, so that the upper sets, and the other parts are suitably dried.

The end of the return trip in the dryer brings the baskets into position to resume their travel along the track 30. At the next station 62, the midsole or pad is placed on the lasted upper, and the outsole is placed on the midsole or pad, in the correct relationship for pressing. The pressing is done at station 63 by a suitable press 64, and the shoes are moved on to station 65 for cleaning off cement from the exposed surface between upper and midsole. A rotary brush 66 may be used for this purpose.

It is desirable to provide a storage space 67 next in line, as the succeeding operators at station 68 perform miscellaneous hand work such as cleaning, repairing, retouching, etc. They then push the baskets of shoes into dryer 69.

This dryer is similar in construction and operation to the dryer 61, but I prefer to use a higher temperature than in the first one, about 115° F., for about one and a half to two hours. This final drying of the assembled and pressed shoe serves to further cure the cement binding the parts together, removes moisture and further sets the shoe to the last, which improves the fit and assures that the shoe will retain its shape. I have found it desirable in some cases to employ more than one dryer unit at this point, with a cooling off period in between.

After coming from the dryer 69, the lasts are pulled at station 70 and the shoes are moved to station 71 where sock linings or heel pads are inserted, depending on the detailed construction of the shoes. Laces, if used, are put on at station 72, a final inspection is made at station 73, and the shoes are packed in boxes at station 74.

The room temperature where the operations are performed is normally maintained at 75° to 80° F. By my method of assembling all the parts for each pair of shoes in a work basket prior to starting them in the production line, they are kept at the same varying temperatures throughout the alternate normal and increased temperatures, thus seasoning simultaneously. Another important feature is that the parts are all at the same temperature when assembled, so that the effect of expansion and contraction is common to all the parts, and any tendency toward readjustment by shrinkage after assembling is minimized. The normal elapsed time of any given pair of shoes through the production line as herein described is less than a day.

Baskets and lasts may be carried back to the assembly point by an overhead carrier, or any suitable means, not illustrated.

Figure 2:
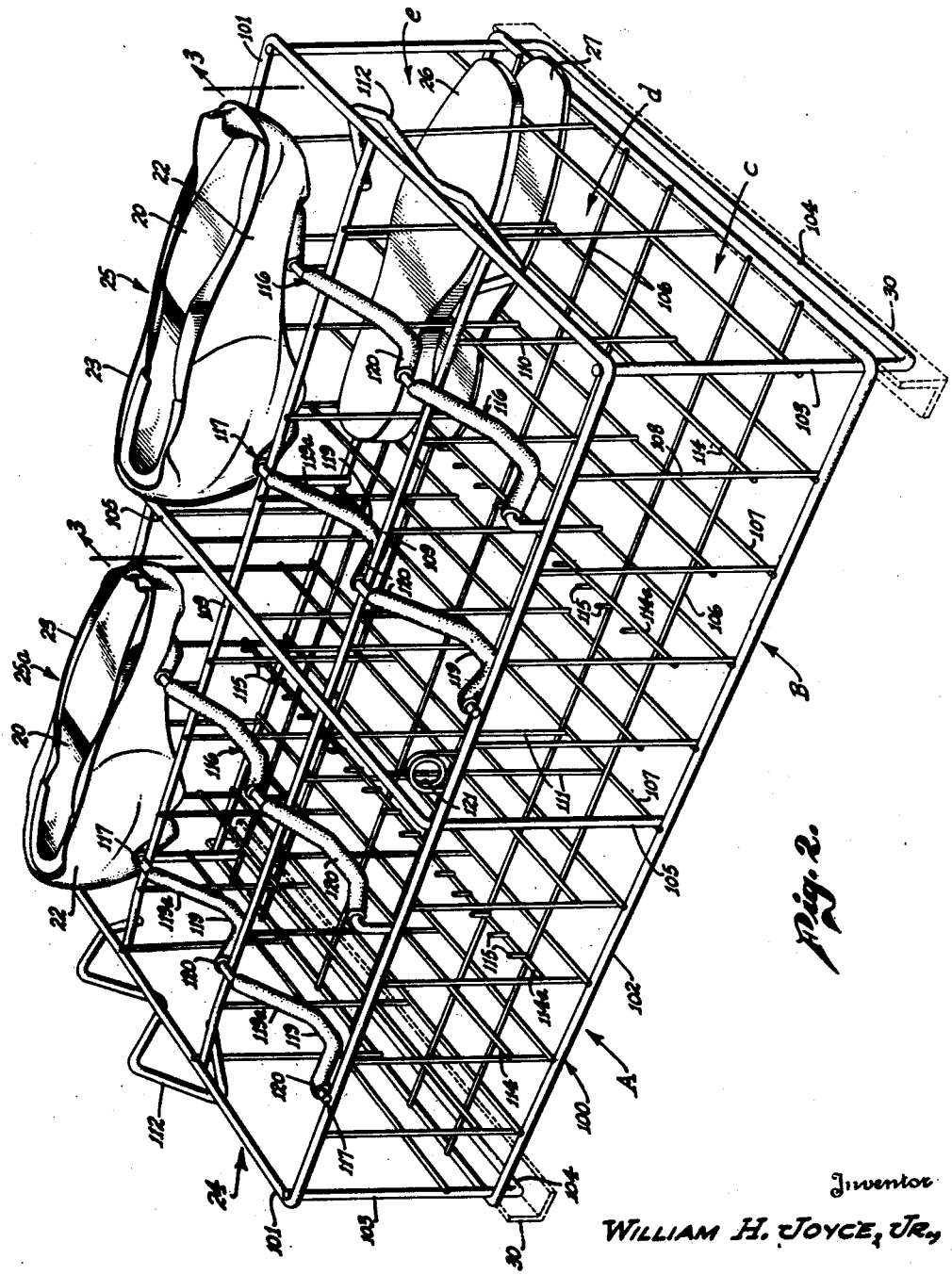
Figure 2 is a perspective view of one of the work baskets employed, and illustrating parts for one pair of shoes. Parts for two additional pairs of shoes have been omitted to more clearly show the details of the basket.

The specially designed work basket 24, as illustrated in Figure 2, comprises a frame 100 which includes an upper rectangular heavy wire member 101 and a corresponding lower rectangular heavy wire member 102, spaced and supported by vertical end members 103. The wires throughout the basket may be spot welded or joined by any desired means. The end members are preferably U shaped, each having a horizontal portion 104 which extends below and parallel to the end of the lower rectangular member 102. The extensions 104 are adapted to rest in and slide along the track 30.

An inverted U shaped intermediate bracing member 105 increases the rigidity of the basket and divides the basket into two sections A and B. The floor of the basket is made up of longitudinal wires 106 and lateral wires 107, joined to the lower rectangular member 102. Vertical intermediate wires 108 are joined to the upper and lower rectangular members 101 and 102 at both sides of the basket. Each half of the basket is divided into three major compartments by upper longitudinal frame members 109 and vertical members 110 corresponding to the vertical members 108 but secured at the lower end to the wires 107. Additional vertical members 111 extend between the horizontal part of the member 105 and the corresponding cross wire 107.

At each end of the basket is secured an attaching member 112 in the form of wire loops which extend obliquely upward from the ends of the basket to be caught by swiveled hooks 113 in the vertical dryer.

A middle shelf in the basket is made up of cross wires 114 and 114a. The wires 114a are provided with short upstanding pins 115.

The upper tray or cradle of the basket, intended to contain the lasts and uppers of the shoe, consists of cross wires 116 and 117 bent so that when an inverted last is seated therein the rear portion of the last provided with a notch 118 rests on a relatively deep narrow flat section 119 of the wire 117, and the sides of the last and the shoe upper nestle snugly in the tapered extensions 119a of the wire. The wire 116 provides a more shallow depression in which the toe portion of the inverted last fits.

The wires 116 and 117 are preferably covered at least in part with a white rubber tubing 120 or other clean cushioning element to avoid possibility of the wires abrading or discoloring the shoes.

As seen from this description, the basket is divided into twin sections A and B, and each section is divided into three major compartments c, d, and e. Parts for each pair of shoes are to be contained in the corresponding compartments of the opposite sections A and B. It is intended that the upper and last be seated in the upper tray or cradle, the midsole or pad be disposed on the middle shelf, and the outsole be rested upon the floor of the basket.

The purpose of the pins 115 is to frictionally engage the midsole or pad to prevent it from sliding out, and also to reduce the area of contact between the midsole or pad and its supporting element in the basket after it has been cemented on both sides and before the shoe parts are finally assembled.

A spring clip 121 is provided to carry work tickets or the like. If counters are used in the shoes, they may be hung over any one of the upper horizontal frame wires.

While I have shown a basket adapted to contain three pairs of shoes it is obvious that the basket construction may be suitably altered for carrying more or less than three pairs. Metallic, wood or plastic strips may be substituted for the wires. The important thing is to provide lightness and rigidity. Some advantage is realized also by large apertures so that the parts may be seen, and a full circulation of air around the parts be maintained.

The last which I have devised and which has particular utility in connection with the work basket described, is characterized by the provision of the notch 118 formed by cutting out part of the block 122 and the tops 123. This notch has a flat surface 124 adapted to rest on the flat section 119 of the upper wire tray in the basket, and the inclined edge of the tops and the vertical end of the block is adapted to engage the wire to prevent the last from shifting forward or backward.

As before stated, the vertical dryers 61 and 69 are similar and may be identical. The description of one will be sufficient.

A supporting frame 130 is mounted on the floor 131 of the work room and provides support for a crosspiece 132. The track 30 is laid on the crosspiece 132.

A vertical tower 133 comprised of the frame 130 and sheet metal walls forms a drying chamber. The end faces 134 and 135 of the tower are open as illustrated in the region of the track 30 so that the baskets 24 may be pushed in at one side and withdrawn from the other side.

A pair of large sprockets 136 are suitably mounted at the lower part of the tower and a corresponding pair of sprockets 137 are mounted at the upper part of the tower. Endless chains 138 are trained over the sprockets 136. The lower sprockets are driven by any suitable source of power such as an electric motor M which may have an adjustable V pulley P driving a belt B and operating through a gear box G to reduce the speed, and sprockets S and S1 and a chain C. Any other power source and any suitable means of gear reduction, but preferably with a change of speed control of any conventional type may be used.

On regularly spaced links of chains 138 are swiveled hook members 113 previously referred to, each comprising a bifurcated rod or wire each leg of which terminates in a hook end 139. I prefer to bend the legs outwardly as indicated at 140 to better clear the chains and also to facilitate the engagement of the hook ends 139 with the loops 112 on the baskets. The hook members 113 hang vertically by gravity, there being corresponding hook members on each of the two chains whereby each pair of hook members captures a work basket if there is one present, as the hook members rise with the chains, and hold the baskets in a continuously horizontal position while the chains travel upwardly and over the upper sprocket 137 and descend to the track 30 on the opposite side of the dryer. As the descending chains and supporting hook members deposit the basket on the track the hooks automatically become disengaged and travel on downwardly and around the lower sprocket.

It is of course necessary for an operator to push a basket into place to be engaged by the hooks on their upward travel, and to remove the basket after it has been deposited at the completion of the journey. Stop members 141 are placed across the track 130 to position the baskets as they are pushed into the dryer and to prevent the baskets from being inadvertently dislodged at the time of their removal.

The timing of the dryer is preferably such that the round trip of each basket in the dryer 61 consumes approximately one hour, and in the dryer 69 approximately one and a half to two hours, although this may be varied to meet operating conditions.

I provide a blower 150, and a heating chamber 151 incorporating an electric heating element 152 controlled by a thermostat 153, by which heated air is introduced at the lower end of the tower as indicated by the arrows in Figure 6. A duct 154 provides for the return of air from the upper part of the tower to the blower for recirculation. Any other form of heating and circulating arrangement may be employed, as conditions indicate.

As described, however, it will be observed that the heated air current in traveling upward through the tower flows with the baskets which are ascending and against the baskets which are descending. The effect is to apply more moderate treatment to the shoes or shoe parts which have been initially introduced, and to increase the intensity of the treatment by the opposing flow of heated air on the shoes or shoe parts which are in the second stage of their treatment within the dryer.

Although I have herein shown and described the particular embodiment of my invention chosen for illustration in what I have conceived to be the most practical and preferred form, it is recognized that departures may be made therefrom within the scope of my invention, which is not to be limited to the details disclosed herein but is to be accorded the full scope of the claims so as to embrace any and all equivalent structures and methods.

Thus, the detailed operations in the production line may vary according to the shoe construction, and variations in the form of apparatus may be allowed.

The essential features of my method as applied to the manufacture of shoes are the initial bringing together of the preformed major parts of each pair of shoes into a basket holding as a work unit a relatively small number of pairs, manually advancing the baskets along a production line track, and performing successive assembly operations on the shoe parts. The operations should be so distributed and timed that the work evenly progresses. The shoe parts and shoes are exposed to room temperature except when in the dryers, and the parts and subsequently the shoes are cured by the timed application of heat controlled air, preferably in at least two periods separated by an interval of room temperature.

The essential features of my baskets are the provision of a floor, shelves and trays or cradles for separately retaining the three major parts of at least one pair of shoes and preferably several, the baskets being of light weight, easily slidable, and open for inspection of the shoe parts and access to them, circulation of air, and means by which the trays are readily picked up on the traveling hook members in the dryers.

The essential feature of my last is the notch.

The essential features of the dryers are the means for automatically picking up the baskets, conducting them through a chamber, and automatically depositing them at the end of their travel, with means for forcing through the chamber a circulation of heated air the temperature of which is controlled.

By my invention, whether it be applied to the manufacture of shoes, or other articles, I am able to eliminate the disadvantages of the conventional assembly line or the large container method. Specifically, my method achieves the following advantages: (1) It allows for variables in design, pattern, materials and labor without sacrificing total production speed. (2) Parts are pre-selected, eliminating discretionary selection at the various work stations. (3) It economizes space and equipment. (4) It materially reduces the manufacturing time for each article. (5) It reduces the total inventory in process. (6) In the case of articles which must be clean for saleability, it reduces the chances of being soiled.

The same basic method, and the essential apparatus comprising the baskets or other containers and the track, can be employed for manufacturing other types of shoes than herein specifically described, and for numerous other articles. The containers should preferably be divided into compartments each holding the parts for one article, and these compartments are preferably subdivided to hold the individual parts. If the parts are of some odd shape, the subdivision may conveniently be designed to form a cradle to accommodate that shape. The track is important to maintain the sequence of operations and avoid loss of parts.

The specific advantages of my method as used for manufacturing shoes are:

1. The work flows through in an orderly predetermined manner so there are no mixed lots or cases in the packing room.

2. Supervision is made extremely easy inasmuch as the entire work processes are under the eye of the supervisor.

3. The time cycle is a great time savings over rack systems.

4. The shoes can be kept extremely clean avoiding cleaning and repairing later on.

5. Production figures under this system for each machine are generally higher than under any other methods.

6. The scientifically designed height of the track and shape of the baskets provides an easy reach and left-hand pick for the operator, reducing fatigue.

7. There is a substantial saving on labor costs from the assembly point to the shipping room.

8. 1000 to 1100 pairs of lasts will produce 700 pairs a day thus reducing last costs below slower systems.

9. Costly racks are entirely eliminated and necessity of employing rack pushers and the hazard of tipping over racks is eliminated.

10. The employment of (a) infrared light and heat treatment, (b) a one-hour dwell in the first curing unit, (c) a two-hour dwell in the second curing unit is the equivalent of five days on the wood.

11. The flow of work is done manually, i. e., each operator pushes a completed basket on to the next operator. By so spacing the machines as to allow for a work basket at the side of the operator, and up to three more baskets in reserve in back of him, this provides sufficient shoes to absorb any extra time necessary to devote to one hard shoe, by off-setting this with a ratio of easy shoes so that the even flow of work will be maintained. This is of utmost importance as compared to any system employing a mechanical flow and constant speed, because under those methods a hard shoe taking more time than is allowed by the speed of the line must either (a) be pulled off, (b) be back-tracked, or (c) the line must be stopped in order that the shoe may be completed by that particular workman and then the line started up again and because of the beneficial psychological factor involved in the manual control versus the mechanical movement.

12. The design of the basket provides a perfect cradle for the last eliminating any possibility of the shoe ever falling to the floor or, if a spindle is used, the time required by the operator to fit the last thimble over the spindle.

13. Orderliness and good housekeeping.

14. Reduction of between 15% and 30% in necessary square feet floor area.

Having described my invention, what I claim as new and desire to secure by Letters Patent is:

1. In the manufacture of cemented shoes, the method which comprises, placing preformed parts of shoes including uppers, insoles and outsoles each in a separate position provided therefor in a container adapted to hold a relatively small number of shoes, the parts of each of said shoes being placed adjacent each other, providing a plurality of said containers having said parts therein and performing successive assembly operations at successive stations with and on said parts, manually moving the containers between stations successively along a fixed path extending past all of said stations without diverting said containers from said path during normal assembly operations, said assembly operations including the steps of applying cement to at least certain of said parts, thereafter subjecting all of the parts of each shoe to a heating and drying operation, thereafter pressing the cemented parts together and thereafter again subjecting all of the parts of each shoe to a further heating and drying operation, continuing said assembly operations until all of said parts have been assembled into shoes and removing assembled shoes from said containers.

2. In the manufacture of shoes, the method which comprises, providing a path through which a series of containers each adapted to receive a series of lasts and the parts of the shoe to be assembled thereon are moved, said path passing a series of work stations from an assembling station to a final inspection station, said work stations including at least three drying stations through which all of the parts of the shoe are passed, one located to dry toe box material, one located to dry cement soles, and the third located just prior to a last pulling station, and so controlling the moisture content of the parts at the beginning that none of the aforesaid drying operations adversely affects the parts not yet assembled in the shoe.

WILLIAM H. JOYCE, Jr.